F. P. STEINHAUER
May 5, 1931. PORTABLE OIL AND GAS SERVICE STATION Re. 18,063
Original Filed April 26, 1926 2 Sheets-Sheet 1
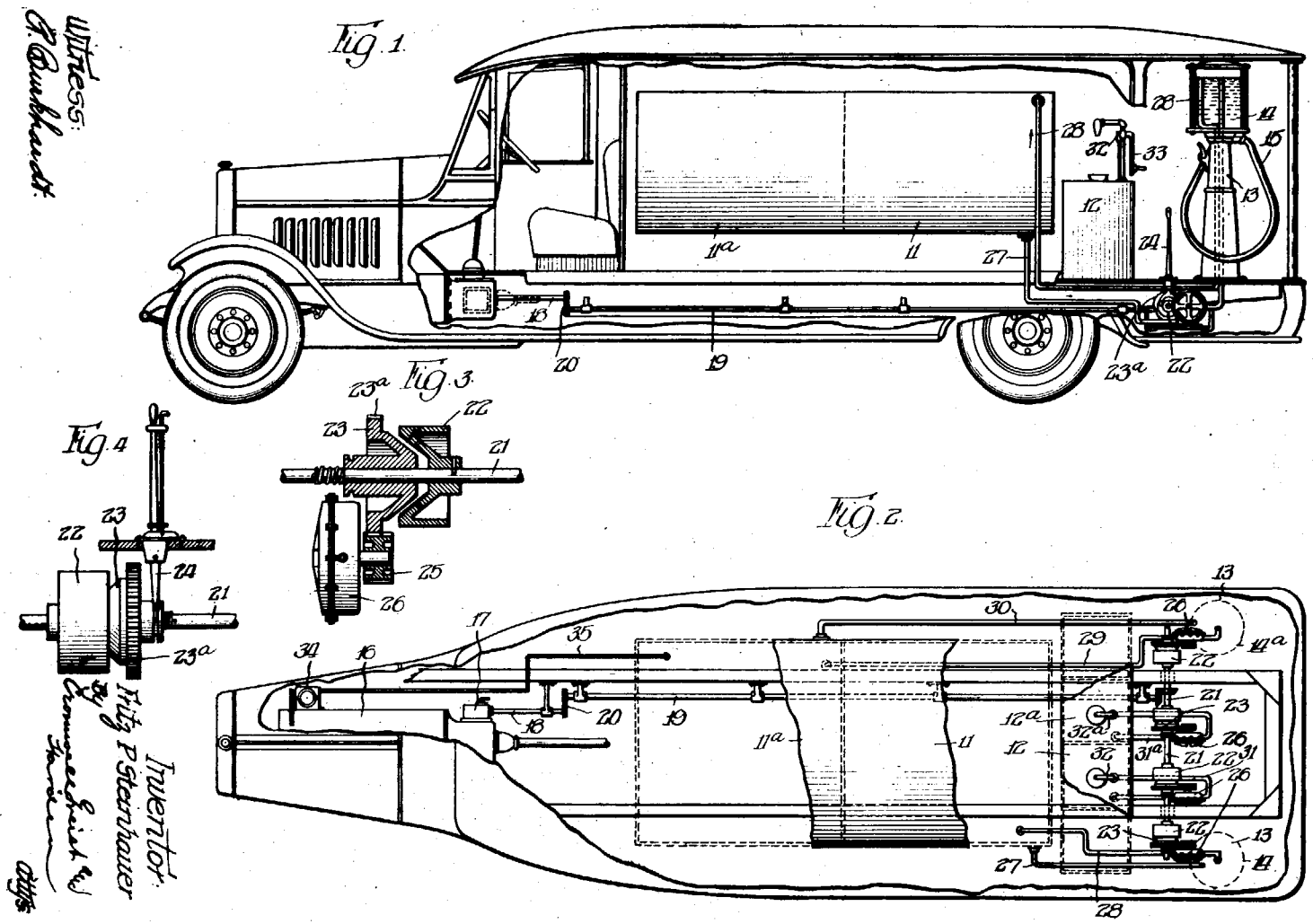
Inventor
Fritz P Steinhauer
By Cromwell, Greist & Harden
Attys
Witness:
A. Burkhardt

F. P. STEINHAUER

May 5, 1931. PORTABLE OIL AND GAS SERVICE STATION Re. 18,063

Original Filed April 26, 1926 2 Sheets-Sheet 2

Witness:
P. Burkhardt

Inventor:
Fritz P. Steinhauer,
By Cromwell, Greist & Warden
Attys.

Reissued May 5, 1931

Re. 18,063

UNITED STATES PATENT OFFICE

FRITZ P. STEINHAUER, OF CHICAGO, ILLINOIS, ASSIGNOR OF ONE-FIFTH TO GEORGE A. SCHNEIDER, OF CHICAGO, ILLINOIS

PORTABLE OIL AND GAS SERVICE STATION

Original No. 1,764,057, dated June 17, 1930, Serial No. 104,862, filed April 26, 1926. Application for reissue filed March 20, 1931. Serial No. 524,027.

This invention relates to an oil and gasoline purveying tank car, the primary object being the provision in an automobile of storage tanks for various grades of oil and gasoline with means for dispensing measured quantities as desired from any one of such tanks at the place of business of customers, or to the traveling public along the highway by scouts, or to automobiles congregated at parking places, instead of requiring customers to drive their cars to a permanently located filling station as is now the usual practice.

Further refinements of the invention include the provision of measuring devices such as standpipes with visible containers supplied from the storage tanks by pumps driven from the motor or electric generator or storage battery of the car.

As before indicated, it is almost universal custom for owners of passenger or delivery cars, trucks and other automobiles, to drive at intervals to established filling stations for the purpose of filling their tanks. This entails inconvenience and loss of time, and frequently the car owner, to avoid such trouble, postpones going for gasoline longer than is wise and finds his supply exhausted at a critical time when unable to drive under his own power to the nearest station.

By my invention, gasoline and oil can readily be delivered to the customer at his own home or garage in the same manner as ice and milk are regularly supplied to the consumer.

Contractors, express companies, and others having fleets of trucks can be visited at regular intervals and the tanks of their automobiles replenished without visiting a remote filling station.

In order that the invention may be readily understood, preferred, and modified embodiments of the same are illustrated in the accompanying drawings. It is to be understood, however, that the invention may be embodied in further modified structures without departure from the essence thereof as set forth in the accompanying claims, wherefore the description and illustrations are to be taken in an illustrative and not in an unnecessarily limiting sense.

As set forth in the drawings

Fig. 1 is a side elevation of a tank car embodying the invention, the side being broken away to show the interior arrangement;

Fig. 2 is a similar view in top plan;

Fig. 3 represents in section, a conventional form of clutch connected to a rotary pump;

Fig. 4 is a detail of conventional means for operating the clutch;

Figure 5:
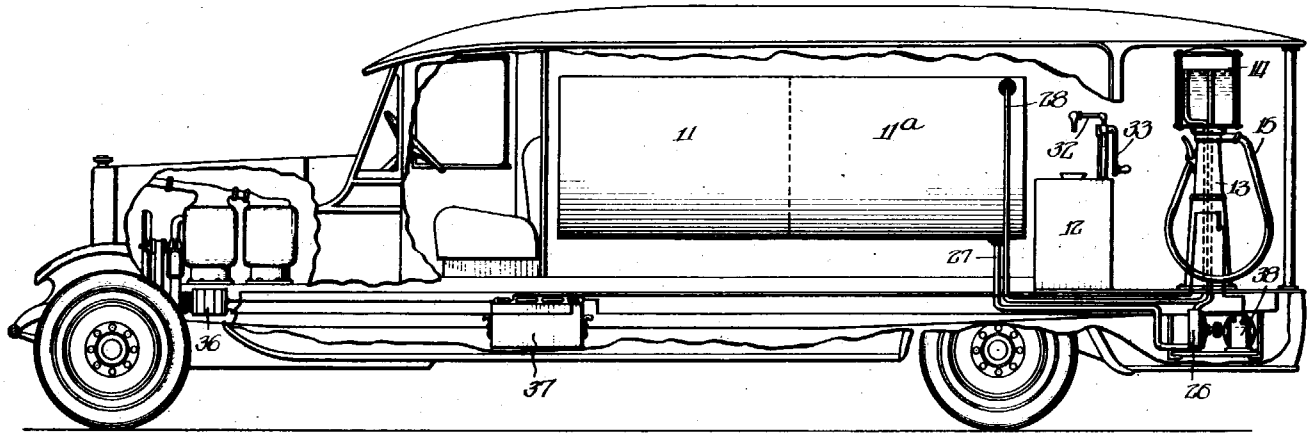
Fig. 5 is a view similar to Fig. 1 but showing a modification.

Having particular reference to Figs. 1 to 4 inclusive, the car houses within its interior, one or more gasoline storage tanks 11 and 11[a] and one or more oil storage tanks 12 and 12[a], one or more measuring standpipes 13 and 13[a] carrying visible measuring containers or meters 14 and 14[a] equipped with the usual dispensing hose 15. The motor 16 of the car has its power take-off 17 and stub shaft 18 operatively connected with the driven shaft 19 by means of sprockets and sprocket chains 20. The driven shaft 19 in turn drives the counter shaft 21 by means of beveled pinions, and the counter shaft, being continuous, has fixed thereon clutch elements 22 which cooperate with other clutch elements 23 which are shiftable axially into and out of engagement with the clutch element 22 by means of the clutch lever 24. Each of the shiftable clutch elements 23 is in operative connection by means of gear teeth 23[a] and pinions 25 with a rotary pump 26. Each of the pumps 26 is interposed in a supply pipe leading from one of the storage tanks to one of the meters or measuring devices, whereby the liquid is drawn from one of the storage tanks and forced into the measuring device. The supply pipe 27 leads from the lower portion of the gasoline tank 11 by way of its pump 26 to the visible container 14 of one of the standpipe meters while an excess return pipe 28 leads from the proper level of the liquid within the meter and discharges into the upper portion of the tank 11. Similarly the supply pipe 29 leads from the lower portion of the gasoline tank 11ᵃ by way of its pump 26 to the visible container 14ᵃ of its measuring device or meter and an excess return pipe 30 leads from the meter to the upper part of the gasoline tank 11ᵃ.

Supply pipes 31 and 31ᵃ lead from the bottom of oil tanks 12 and 12ᵃ by way of their respective pumps to measuring and delivery devices 32 and 32ᵃ here shown as manually operated by means of the hand cranks 33.

The operation of the embodiments shown in these Figures 1 to 4 inclusive, as heretofore described, will be readily understood. Having arrived at the dispensing point, the motor of the car is disconnected by means of the usual clutch from the driving wheels of the car and the power take-off drives the shaft 19 which in turn drives the counter shaft 21. If it is desired to dispense gasoline from the tank 11, the proper clutch is thrown into engagement to actuate the pump 26 in the supply pipe 27 whereby gasoline is forced from the tank into the visible meter 14 of the standpipe 13. When the proper amount has passed over, the clutch is thrown out and any excess is returned by way of the pipe 28 to the tank 11. The dispensing hose 15 then serves to empty the meter into the tank of the automobile being served. In a similar manner gasoline can be forced from the tank 11ᵃ into its meter 14ᵃ and thence dispensed. By the operation of the proper clutch oil can be supplied from any one of the tanks as may be desired.

As an optional arrangement for forcing the gasoline or oil from the respective tanks to the measuring devices, the tank car is provided with an air compressor 34 from which duplicates of pipe 35 lead to the upper portion of the respective tanks. The air pressure thus generated within the tank above the liquid will force the liquid at will to the respective measuring and delivery devices, valves being interposed where found desirable to control the flow.

Figure 6:
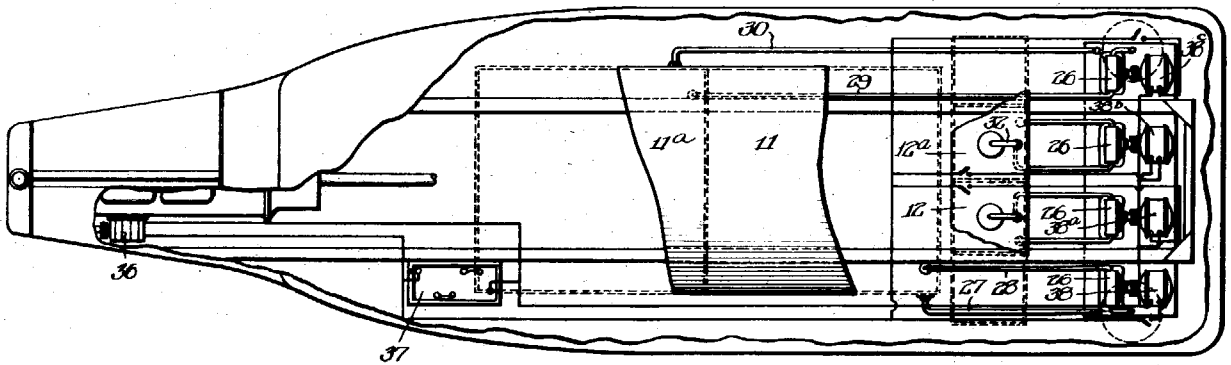
Fig. 6 is a view similar to Fig. 2 but showing the modification of Fig. 5.

In Figs. 5 and 6 of the drawing, a modified structure is shown whereby the pumps are driven from the motor indirectly by means of electric current supplied from the motor driven generator 36 and the battery 37 to the electric motors 38, 38ᵃ, 38ᵇ and 38ᶜ, which are connected to the respective pumps 26, the pipe arrangement being advantageously the same or the equivalent of that shown in Figs. 1 to 4 inclusive.

In this embodiment of the invention, it is not necessary ordinarily to keep the motor running and take the current from the generator 36, but the battery 37 may be drawn upon to supply current to trunk lines and branch lines controlled by switches of any conventional arrangement to the electric motors.

By the term "stand pipe" is understood to be included as an equivalent any conducting device for the dispensed liquid and not necessarily an exposed vertical column such as is illustrated and described by way of example.

Whether the gasoline and oil be forced from the storage tanks to the meters by means of pumps 26 driven directly from the motor 16 of the car or by means of pumps 26 driven by electric motors supplied with current from the motor driven generator 36 or battery 37, or whether the liquid be forced from the storage tanks by air pressure supplied from the compressor 34, this result is caused directly or indirectly by the power plant of the car itself, thus utilizing the same motive power for transporting the filling station from place to place and for dispensing the oil and gasoline when the point of sale is reached.

It will be observed that all of the supply and return pipes, the wiring, the pumps, electric motors and other accessorial operating parts are disposed within the tank car and beneath the structure, leaving the rear platform free of encumberances which would otherwise hamper the attendant in the efficient performance of his dispensing duties.

I claim:

1. A motor driven vehicle equipped with storage tanks for oil and gasoline or other liquid fuel, standpipes with visible meters, a supply pipe connecting each meter with a tank, a dispensing hose from each meter, pumps inserted between the tanks and meters, and means for utilizing the vehicle motor to drive any one of the pumps at will, said means comprising a motor driven counter shaft, and clutches interposed between the counter shaft and each of the pumps.

2. A motor driven vehicle equipped with storage tanks for oil and gasoline or other liquid fuel, standpipes with visible meters, a supply pipe connecting each meter with a tank, a dispensing hose from each meter, pumps inserted between the tanks and meters, and means for utilizing the vehicle motor to drive any one of the pumps at will, said means comprising an electric generator and storage battery, electric motors driven thereby and connected with the pumps, and switches disposed in each circuit.

3. A motor driven vehicle equipped with storage tanks for oil and gasoline or other liquid fuel, standpipes with visible meters, a supply pipe connecting each meter with a tank, a dispensing hose from each meter, and means effectuated by the power plant of the vehicle to force the liquid through the supply pipes from the storage tanks to the meters, said means comprising a compressor delivering air under pressure into the tanks above the level of the liquid therein.

4. A motor driven vehicle equipped with storage tanks for oil and gasoline or other liquid, liquid measuring and indicating devices, supply pipes connecting the measuring devices with the respective storage tanks, dispensing pipes leading from the measuring devices, pumps interposed in the supply pipes, and means driven by the vehicle power plant for operating the pumps alternatively.

5. A motor driven vehicle equipped with storage tanks for oil and gasoline or other liquid, liquid measuring and indicating devices, supply pipes connecting the measuring devices with the respective storage tanks, dispensing pipes leading from the measuring devices, pumps interposed in the supply pipes, and means energized by the vehicle motor for operating the pumps alternatively, the vehicle having an attendant's platform supporting the measuring and indicating devices and unobstructed by the pipes and pumps and other operating mechanism.

6. In a portable service station, a motor driven vehicle having an enclosed body and a service platform, storage tanks disposed within the body enclosure, standpipes with visible measuring devices mounted on the service platform, a supply pipe connecting each measuring device with a storage tank, a dispensing pipe leading from each measuring device, pumps inserted between the tanks and measuring devices, and power transmission means connecting the vehicle-driving motor with the pumps.

7. In a portable service station, a motor driven vehicle having an enclosed body and a service platform, storage tanks disposed within the body enclosure, standpipes with visible measuring devices mounted on the service platform, supply pipes connecting the measuring devices with the tanks, dispensing pipes leading from the measuring devices, pumps inserted between the tanks and measuring devices, and transmission means between the vehicle-driving motor and the pumps, said transmission means including a manually operated clutch for each pump, the pumps and supply pipes being located below the vehicle body.

In testimony whereof I have hereunto subscribed my name.

FRITZ P. STEINHAUER.